(12) United States Patent
Chen

(10) Patent No.: US 12,237,766 B2
(45) Date of Patent: Feb. 25, 2025

(54) SWITCHING CHARGER HAVING FAST DYNAMIC RESPONSE FOR TRANSITION OF LOAD

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 326 days.

(21) Appl. No.: 17/946,597

(22) Filed: Sep. 16, 2022

(65) Prior Publication Data

US 2023/0336077 A1 Oct. 19, 2023

(30) Foreign Application Priority Data

Apr. 19, 2022 (TW) .................................. 111114746

(51) Int. Cl.
*H02M 3/157* (2006.01)
*H02M 1/00* (2007.01)

(52) U.S. Cl.
CPC ......... *H02M 3/157* (2013.01); *H02M 1/0009* (2021.05); *H02M 1/0025* (2021.05); *H02J 2207/20* (2020.01)

(58) Field of Classification Search
None
See application file for complete search history.

(56) References Cited

U.S. PATENT DOCUMENTS

| | | | | |
|---|---|---|---|---|
| 8,570,011 B2* | 10/2013 | Gritti | ...................... | H02M 3/156 323/282 |
| 10,020,734 B2* | 7/2018 | Zhong | ...................... | H02M 1/36 |
| 10,122,278 B1* | 11/2018 | Xue | ...................... | H02M 3/158 |
| 10,283,994 B2* | 5/2019 | Chen | ...................... | H02M 3/158 |
| 10,917,005 B2* | 2/2021 | Wiktor | ...................... | H02M 3/158 |
| 11,128,218 B2* | 9/2021 | Hsu | ...................... | H02M 1/08 |
| 2016/0204631 A1 | 7/2016 | Houston et al. | | |
| 2019/0252893 A1 | 8/2019 | Gurlahosur | | |

FOREIGN PATENT DOCUMENTS

TW 201630300 A 8/2016

* cited by examiner

Primary Examiner — Nguyen Tran
Assistant Examiner — Naomi Carrier
(74) Attorney, Agent, or Firm — Li & Cai Intellectual Property (USA) Office

(57) ABSTRACT

A switching charger having fast dynamic response for transition of a load is provided. A first terminal of a high-side switch is coupled to an input voltage. A first terminal of a low-side switch is connected to a second terminal of the high-side switch. A first terminal of an inductor is connected to a node between the first terminal of the low-side switch and the second terminal of the high-side switch. A second terminal of the inductor is connected to a first terminal of a capacitor. A constant on-time circuit determines a duty cycle of an on-time signal according to the input voltage and an output voltage of a node between the second terminal of the inductor and the first terminal of the capacitor. A control circuit controls a driver circuit to drive the high-side switch and the low-side switch according to the on-time signal.

17 Claims, 8 Drawing Sheets

SWITCHING CHARGER HAVING FAST DYNAMIC RESPONSE FOR TRANSITION OF LOAD

CROSS-REFERENCE TO RELATED PATENT APPLICATION

This application claims the benefit of priority to Taiwan Patent Application No. 111114746, filed on Apr. 19, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a switching charger, and more particularly to a switching charger having fast dynamic response for transition of a load.

BACKGROUND OF THE DISCLOSURE

In recent years, with the continuous advancement of technology, various electronic products with different functions have gradually been developed to satisfy different requirements. Such electronic products have become an indispensable part of people's daily lives and make people's lives more convenient. The electronic product may include a plurality of electronic components to which different power voltages need to be supplied. Therefore, a conventional switching charger is used to convert input voltages into different appropriate power voltages and supply the appropriate power voltages respectively to the electronic components such that the electronic product can operate normally.

However, when a load of the conventional switching charger transits, for example, from a heavy load to a light load or from the light load to the heavy load, a high-side switch and a low-side switch of the conventional switching charger cannot be switched quickly according to transition of the load. As a result, an inrush wave is generated in an output current signal or an output voltage signal of the conventional switching charger, which causes damages in the conventional switching charger and other circuit components connected to the conventional switching charger. Alternatively, the conventional switching charger supplies an insufficient voltage by which the battery cannot be charged to a target voltage.

SUMMARY OF THE DISCLOSURE

In response to the above-referenced technical inadequacies, the present disclosure provides a switching charger having fast dynamic response for transition of a load. The switching charger includes a high-side switch, a low-side switch, a driver circuit, a constant on-time circuit and a control circuit. A first terminal of the high-side switch is coupled to an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of an output capacitor. A second terminal of the output capacitor is grounded. An output node between the second terminal of the inductor and the first terminal of the output capacitor is connected to the load. The driver circuit is connected to a control terminal of the high-side switch and a control terminal of the low-side switch. The driver circuit is configured to drive the high-side switch and the low-side switch. The constant on-time circuit is configured to obtain the input voltage. The constant on-time circuit is configured to obtain a voltage of the output node as an output voltage of the switching charger. The constant on-time circuit is configured to determine a duty cycle or a width of a pulse wave of an on-time signal according to the input voltage and the output voltage of the switching charger. The constant on-time circuit is configured to output the on-time signal. The control circuit is connected to the driver circuit and the constant on-time circuit. The control circuit is configured to control the driver circuit according to the on-time signal.

In certain embodiments, the switching charger further includes an error amplifier. A first input terminal of the error amplifier is connected to the output node. A second input terminal of the error amplifier is connected to a first reference voltage. An output terminal of the error amplifier is connected to an input terminal of the control circuit.

In certain embodiments, the switching charger further includes a comparator. A first input terminal of the comparator is connected to a ramp signal generator. A second input terminal of the comparator is connected to the output terminal of the error amplifier. An output terminal of the comparator is connected to the control circuit. The comparator is configured to compare an error amplified signal outputted by the error amplifier with a ramp signal outputted by the ramp signal generator to output a pulse width modulation signal. The control circuit controls the driver circuit according to the pulse width modulation signal and the on-time signal.

In certain embodiments, when the control circuit determines that a duty cycle of the pulse width modulation signal is larger than the duty cycle of the on-time signal or determines that a width of a pulse wave of the pulse width modulation signal is larger than the width of the pulse wave of the on-time signal, the control circuit controls the driver circuit according to the pulse width modulation signal.

In certain embodiments, when the control circuit determines that the duty cycle of the pulse width modulation signal is not larger than the duty cycle of the on-time signal or determines that the width of the pulse wave of the pulse width modulation signal is not larger than the width of the pulse wave of the on-time signal, the control circuit controls the driver circuit according to the on-time signal.

In certain embodiments, the switching charger further includes a current sensor circuit and a voltage parking circuit. The current sensor circuit is connected in series to a battery. The voltage parking circuit is connected to the current sensor circuit and the second input terminal of the comparator. The current sensor circuit is configured to sense a charging current that flows to the battery from the output node to output a current sensed signal. The voltage parking circuit outputs a voltage parked signal to the second input terminal of the comparator according to the current sensed signal.

In certain embodiments, the switching charger further includes a current sensing amplifier. The current sensing amplifier is connected to the current sensor circuit and the voltage parking circuit. The current sensing amplifier is configured to amplify the charging current sensed by the current sensor circuit to output a current amplified signal to the voltage parking circuit. The voltage parking circuit outputs the voltage parked signal to the second input terminal of the comparator according to the current amplified signal.

In certain embodiments, the switching charger further includes an operational amplifier. A first input terminal of the operational amplifier is connected to the voltage parking circuit. A second input terminal of the operational amplifier is connected to an output terminal of the operational amplifier and the second input terminal of the comparator. The voltage parking circuit outputs the voltage parked signal to the first input terminal of the operational amplifier according to the current amplified signal.

In certain embodiments, the switching charger further includes a resistor. A first terminal of the resistor is connected to the voltage parking circuit. A second terminal of the resistor is connected to the first input terminal of the operational amplifier.

In certain embodiments, the switching charger further includes a first feedback capacitor and a second feedback capacitor. A first terminal of the first feedback capacitor is connected to the first input terminal of the error amplifier. A second terminal of the first feedback capacitor is connected to a first terminal of the second feedback capacitor. A second terminal of the second feedback capacitor is connected to the output terminal of the error amplifier.

In certain embodiments, the switching charger further includes a first feedback switch. A first terminal of the first feedback switch is connected to the first terminal of the first feedback capacitor. A second terminal of the first feedback switch is connected to the second terminal of the first feedback capacitor.

In certain embodiments, the switching charger further includes a first feedback resistor, a second feedback resistor and a third feedback capacitor. A first terminal of the first feedback resistor is connected to the first input terminal of the error amplifier. A second terminal of the first feedback resistor is connected to a first terminal of the second feedback resistor. A second terminal of the second feedback resistor is connected to a first terminal of the third feedback capacitor. A second terminal of the third feedback capacitor is connected to the output terminal of the error amplifier.

In certain embodiments, the switching charger further includes a second feedback switch. A first terminal of the second feedback switch is connected to the first terminal of the first feedback resistor. A second terminal of the second feedback switch is connected to the second terminal of the first feedback resistor.

In certain embodiments, the switching charger further includes a voltage divider circuit. The voltage divider circuit includes a first voltage dividing resistor and a second voltage dividing resistor. A first terminal of the first voltage dividing resistor is connected to the output node. A second terminal of the first voltage dividing resistor is connected to a first terminal of the second voltage dividing resistor. A second terminal of the second voltage dividing resistor is grounded. A feedback node between the second terminal of the first voltage dividing resistor and the first terminal of the second voltage dividing resistor is connected to the first input terminal of the error amplifier.

In certain embodiments, the switching charger further includes an operational amplifier. A first input terminal of the operational amplifier is connected to the feedback node. A second input terminal of the operational amplifier is coupled to a second reference voltage. An output terminal of the operational amplifier is connected to the first input terminal of the error amplifier.

In certain embodiments, the switching charger further includes a diode. An anode of the diode is connected to the output terminal of the operational amplifier. A cathode of the diode is connected to the first input terminal of the error amplifier.

In certain embodiments, the switching charger further includes a first resistor. A first terminal of the first resistor is connected to the cathode of the diode and a second terminal of the first resistor is connected to the first input terminal of the error amplifier.

In certain embodiments, the switching charger further includes a second resistor. A first terminal of the second resistor is connected to the second terminal of the first resistor. A second terminal of the second resistor is connected to the first input terminal of the error amplifier.

In certain embodiments, the switching charger further includes a first switch component. A first terminal of the first switch component is connected to the first terminal of the first resistor. A second terminal of the first switch component is connected to the second terminal of the first resistor.

In certain embodiments, the switching charger further includes a third resistor and a first capacitor. A first terminal of the third resistor is connected to the cathode of the diode. A second terminal of the third resistor is connected to a first terminal of the first capacitor. A second terminal of the first capacitor is connected to the first input terminal of the error amplifier.

As described above, the present disclosure provides the switching charger having the fast dynamic response for the transition of the load. When the transition of the load instantaneously occurs, the switching of the high-side switch and the low-side switch of the switching charger of the present disclosure can be dynamically adjusted according to the state of the load in real time. Therefore, the output voltage of the switching charger of the present disclosure can be prevented from overshooting or undershooting. As a result, the switching charger of the present disclosure and the other circuit components that receive the output voltage from the switching charger can be prevented from being damaged by the overshooting or the undershooting of the output voltage of the switching charger of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
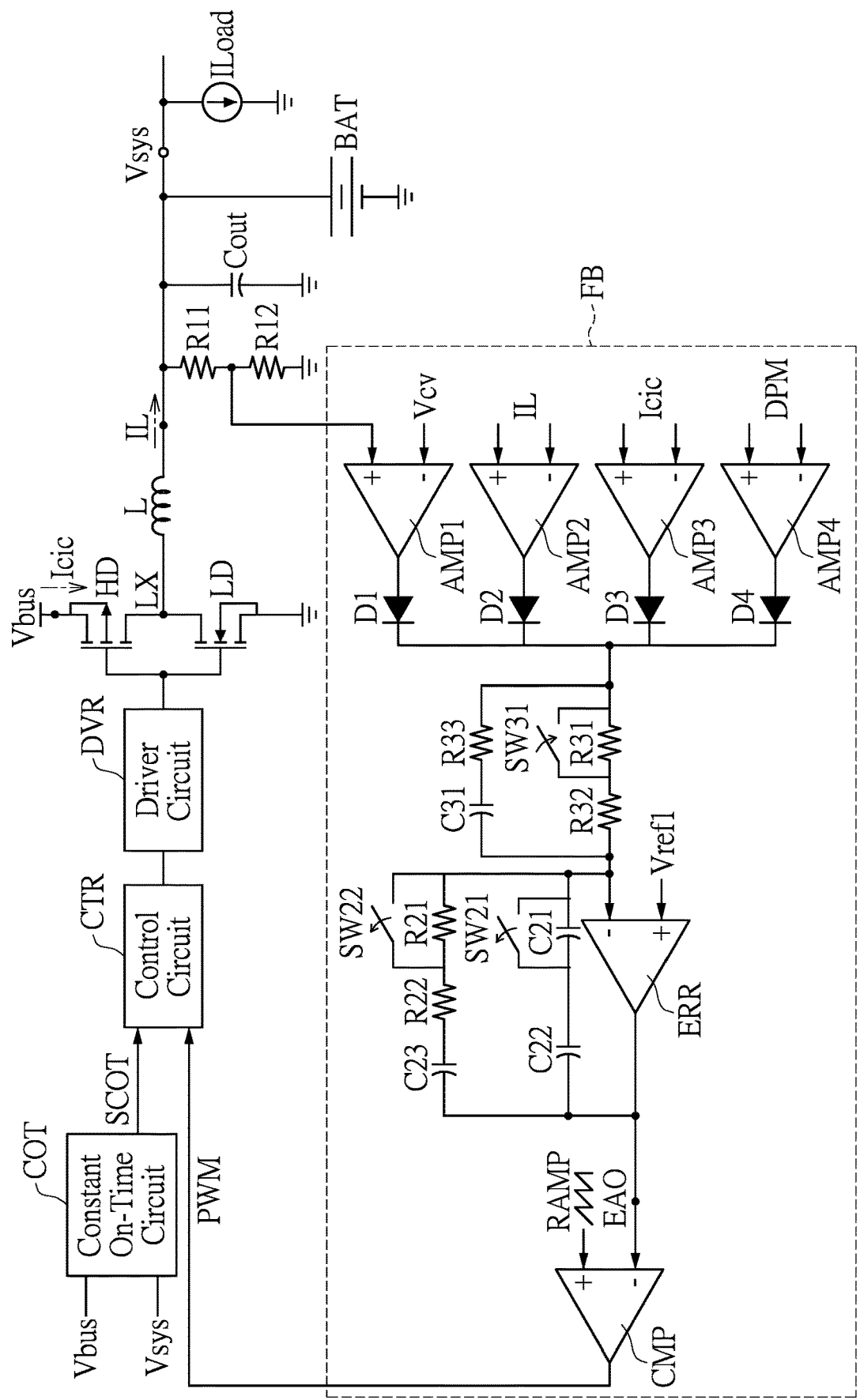
FIG. 1 is a circuit diagram of a switching charger having fast dynamic response for transition of a load according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
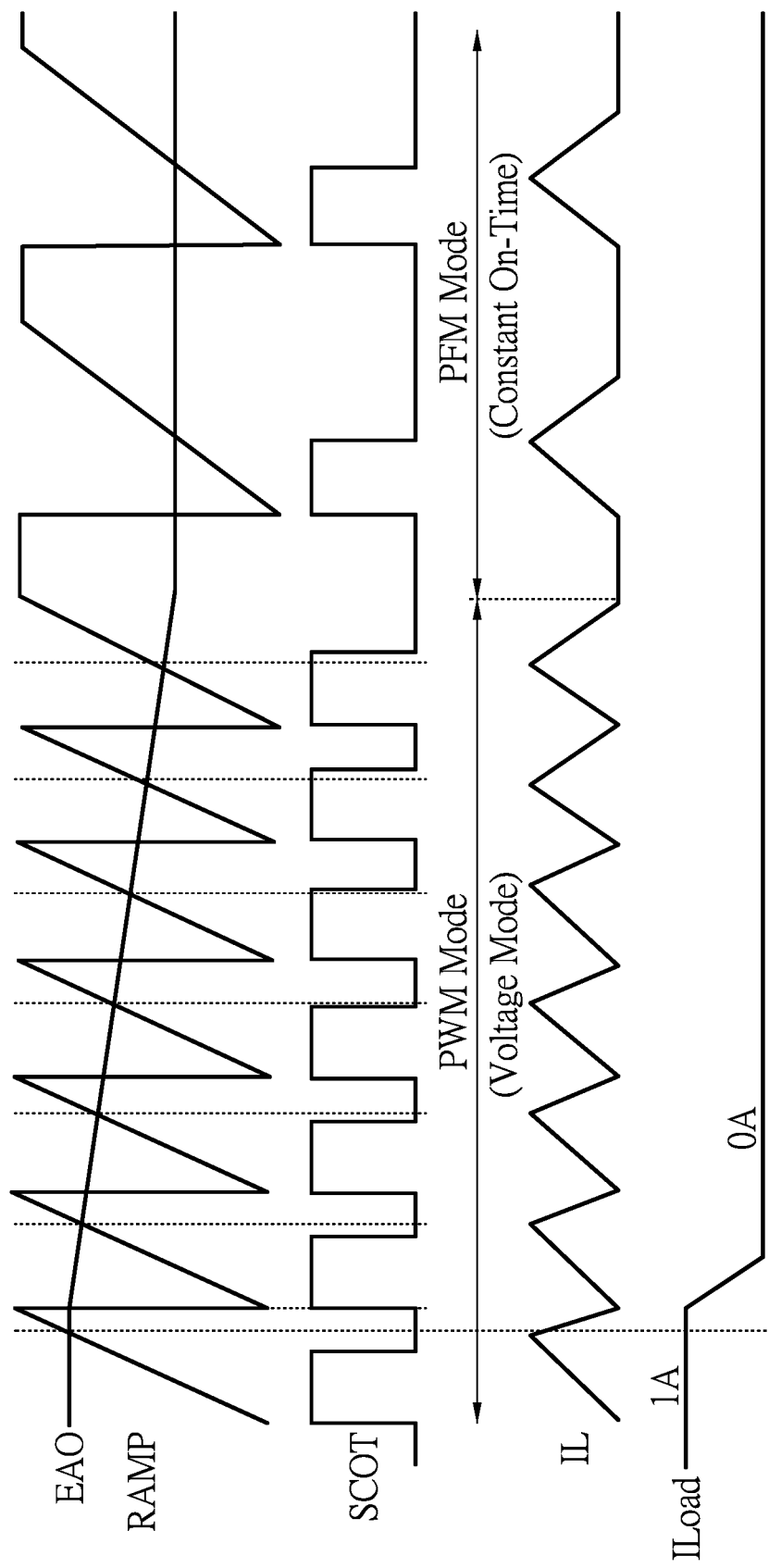
FIG. 2 is a waveform diagram of signals of the switching charger having the fast dynamic response for the transition of the load according to the first embodiment of the present disclosure.

Reference is made to FIGS. 1 and 2, in which FIG. 1 is a circuit diagram of a switching charger having fast dynamic response for transition of a load according to a first embodiment of the present disclosure, and FIG. 2 is a waveform diagram of signals of the switching charger having the fast dynamic response for the transition of the load according to the first embodiment of the pre sent disclosure.

The switching charger of the embodiment of the present disclosure may include a constant on-time circuit COT, a high-side switch HD, a low-side switch LD, a driver circuit DVR and a control circuit CTR as shown in FIG. 1.

A first terminal of the high-side switch HD may be coupled to an input voltage Vbus. A first terminal of the low-side switch LD may be connected to a second terminal of the high-side switch HD. A second terminal of the low-side switch LD may be grounded. A node LX between the first terminal of the low-side switch LD and the second terminal of the high-side switch HD may be connected to a first terminal of an inductor L. A second terminal of the inductor L may be connected to a first terminal of an output capacitor Cout. A second terminal of the output capacitor Cout may be grounded. An output node between the second terminal of the inductor L and the first terminal of the output capacitor Cout may be connected to the load. The output node between the second terminal of the inductor L and the first terminal of the output capacitor Cout is an output terminal of the switching charger.

The driver circuit DVR may be connected to a control terminal of the high-side switch HD and a control terminal of the low-side switch LD. The control circuit CTR may be connected to the driver circuit DVR and the constant on-time circuit COT.

The constant on-time circuit COT may (be coupled to the input voltage Vbus and) obtain the input voltage Vbus. In addition, the constant on-time circuit COT may (be connected to the output node between the second terminal of the inductor L and the first terminal of the output capacitor Cout and) obtain an output voltage Vsys of the output terminal of the switching charger.

It is worth noting that, the constant on-time circuit COT may determine a duty cycle or a width of a pulse wave of an on-time circuit signal SCOT and may output the on-time circuit signal SCOT according to voltage values of the output voltage Vsys and the input voltage Vbus.

For example, the constant on-time circuit COT may calculate a ratio of the output voltage Vsys to the input voltage Vbus, or calculate a difference between the output voltage Vsys and the input voltage Vbus. The constant on-time circuit COT may determine the duty cycle or the width of the pulse wave of the on-time circuit signal SCOT, according to the ratio of the output voltage Vsys to the input voltage Vbus or the difference between the output voltage Vsys and the input voltage Vbus.

The control circuit CTR may output a control signal to the driver circuit DVR according to the on-time circuit signal SCOT from the constant on-time circuit COT. Then, the driver circuit DVR may, according to the control signal, output a high-side driving signal to the control terminal of the high-side switch HD and output a low-side driving signal to the control terminal of the low-side switch LD to properly switch the high-side switch HD and the low-side switch LD.

For example, the larger the duty cycle of the on-time circuit signal SCOT is, the longer the on-time of the high-side switch HD is, but the shorter the on-time of the low-side switch LD is. Conversely, the smaller the duty cycle of the on-time circuit signal SCOT is, the shorter the on-time of the high-side switch HD is, but the longer the on-time of the low-side switch LD is.

As shown in FIG. 1, the switching charger of the embodiment of the preset disclosure may include an error amplifier ERR, a comparator CMP and operational amplifiers AMP1 to AMP4, and a voltage dividing circuit including a first voltage dividing resistor R11 and a second voltage dividing resistor R12, but the present disclosure is not limited thereto.

In practice, some of the circuit components shown in FIG. 1 (such as the operational amplifiers AMP1 to AMP4, the first voltage dividing resistor R11 and the second voltage dividing resistor R12) may be omitted according to actual requirements.

A first terminal of the first voltage dividing resistor R11 may be connected to the output node between the second terminal of the inductor L and the first terminal of the output capacitor Cout. A second terminal of the first voltage dividing resistor R11 may be connected to a first terminal of the second voltage dividing resistor R12. A second terminal of the second voltage dividing resistor R12 may be grounded.

A first input terminal such as a non-inverting input terminal of the operational amplifier AMP1 may be connected to a feedback node between the second terminal of the first voltage dividing resistor R11 and the first terminal of the second voltage dividing resistor R12. A second input terminal such as an inverting input terminal of the operational amplifier AMP1 may be coupled to a second reference voltage Vcv. The operational amplifier AMP1 may output an operation amplified signal according to a voltage of the first input terminal of the operational amplifier AMP1 (that is a voltage of the feedback node) and a voltage of the second input terminal of the operational amplifier AMP1 (that is the second reference voltage Vcv).

Input terminals of the operational amplifiers AMP1 to AMP4 may respectively receive other data such as an output current IL, an input current Icic or a supply voltage DPM, and may respectively other output operation amplified signals according to the received data (and reference voltages).

If necessary, the switching charger of the embodiment of the preset disclosure may include one or more of: diodes D1 to D4, a first resistor R31, a second resistor R32, a first switch component SW31, a third resistor R33 and a first capacitor C31.

Output terminals of the operational amplifiers AMP1 to AMP4 may be connected to anodes of the diodes D1 to D4 respectively. Cathodes of the diodes D1 to D4 may be connected to a first terminal of the first resistor R31. A second terminal of the first resistor R31 may be connected to a first terminal of the second resistor R32. A second terminal of the second resistor R32 may be connected to a first input terminal such an inverting input terminal of the error amplifier ERR.

A first terminal of the first switch component SW31 may be connected to the first terminal of the first resistor R31. A second terminal of the first switch component SW31 may be connected to the second terminal of the first resistor R31. A control terminal of the first switch component SW31 may be connected to the control circuit CTR or other external main control circuits.

A first terminal of the third resistor R33 may be connected to the cathodes of the diodes D1 to D4. A second terminal of the third resistor R33 may be connected to a first terminal of the first capacitor C31. A second terminal of the first capacitor C31 may be connected to the first input terminal such the inverting input terminal of the error amplifier ERR. A second input terminal such as a non-inverting input terminal of the error amplifier ERR may be connected to a first reference voltage Vref1.

A first input terminal such as a non-inverting input terminal of the comparator CMP may be connected to a ramp generator and receive a ramp signal RAMP from the ramp generator. A second input terminal such as an inverting input terminal of the comparator CMP may be connected to an output terminal of the error amplifier ERR. An output terminal of the comparator CMP may be connected to the control circuit CTR.

If necessary, the switching charger of the embodiment of the present disclosure may include one or more of: a first feedback capacitor C21, a second feedback capacitor C22, a first feedback switch SW21, a first feedback resistor R21, a second feedback switch SW22, a second feedback resistor R22 and a third feedback capacitor C23, but the present disclosure is not limited thereto.

A first terminal of the first feedback capacitor C21 may be connected to the first input terminal of the error amplifier ERR. A second terminal of the first feedback capacitor C21 may be connected to a first terminal of the second feedback capacitor C22. A second terminal of the second feedback capacitor C22 may be connected to the output terminal of the error amplifier EAO.

A first terminal of the first feedback switch SW21 may be connected to the first terminal of the first feedback capacitor C21. A second terminal of the first feedback switch SW21 may be connected to the second terminal of the first feedback capacitor C21.

A first terminal of the first feedback resistor R21 may be connected to the first input terminal of the error amplifier ERR. A second terminal of the first feedback resistor R21 may be connected to a first terminal of the second feedback resistor R22. A second terminal of the second feedback resistor R22 may be connected to a first terminal of the third feedback capacitor C23. A second terminal of the third feedback capacitor C23 may be connected to the output terminal of the error amplifier ERR.

A first terminal of the second feedback switch SW22 may be connected to the first terminal of the first feedback resistor R21. A second terminal of the second feedback switch SW22 may be connected to the second terminal of the first feedback resistor R21.

The error amplifier ERR may amplify a difference between a voltage of the first input terminal of the error amplifier ERR and the first reference voltage Vref1 of the second input terminal of the error amplifier ERR to output an error amplified signal EAO to the second input terminal of the comparator CMP.

The first input terminal such as the non-inverting input terminal of the comparator CMP may receive the ramp signal RAMP from the ramp generator. The comparator CMP may compare a voltage of the error amplified signal EAO with a voltage of the ramp signal RAMP to output a pulse width modulation signal PWM to the control circuit CTR.

The control circuit CTR may control the driver circuit DVR to drive the high-side switch HD and the low-side switch LD according to the pulse width modulation signal PWM. For example, the larger the duty cycle of the pulse width modulation signal PWM is, the longer the on-time of the high-side switch HD is, and the shorter the on-time of the low-side switch LD is. Conversely, the smaller the duty cycle of the pulse width modulation signal PWM is, the shorter the on-time of the high-side switch HD is, and the longer the on-time of the low-side switch LD is.

It is worth noting that, as shown in FIG. 1, a feedback circuit FB includes a large number of circuit components that perform operations for a long time. When the load is instantaneously removed or transits from the heavy load to the light load, the error amplified signal EAO generated by the error amplifier ERR of the feedback circuit FB slowly falls as shown in FIG. 2. As a result, the duty cycle and the width of the pulse wave of the pulse width modulation signal PWM that is generated according to the error amplified signal EAO and the ramp signal RAMP by the comparator CMP of the feedback circuit FB are slowly reduced as shown in FIG. 2.

It should be understood that, when the load instantaneously transits from the heavy load to the light load, a load current Iload required for the load is decreased. When the load is instantaneously removed, the load current ILoad is not required for the load. At this time, if the control circuit CTR cannot instantly turn off the high-side switch HD and turn on low-side switch LD according to the duty cycle of the pulse width modulation signal PWM outputted by the feedback circuit FB as shown in FIG. 1, the output current IL of the output terminal of the switching charger is too large, which causes damage to the circuit components at the output terminal of the switching charger.

Therefore, the switching charger of the embodiment of the present disclosure includes the constant on-time circuit COT. The constant on-time circuit COT may determine the duty cycle or the width of the pulse wave of the on-time circuit signal SCOT and output the on-time circuit signal SCOT, according to the voltage values of the output voltage Vsys and the input voltage Vbus.

The control circuit CTR may receive the pulse width modulation signal PWM from the comparator CMP of the feedback circuit FB and receive the on-time circuit signal SCOT from the constant on-time circuit COT. The control circuit CTR may compare the duty cycle or the width of the pulse wave of the pulse width modulation signal PWM with that of the on-time circuit signal SCOT to determine which one of the pulse width modulation signal PWM and the error amplified signal EAO is used to control the driver circuit DVR to drive the high-side switch HD and the low-side switch LD.

In detail, when the control circuit CTR determines that the duty cycle of the pulse width modulation signal PWM is larger than the duty cycle of the on-time circuit signal SCOT or determines that the width of the pulse wave of the pulse width modulation signal PWM is larger than the width of the pulse wave of the on-time circuit signal SCOT, the control circuit CTR controls the driver circuit DVR to drive the high-side switch HD and the low-side switch LD according to the pulse width modulation signal PWM.

Conversely, when the control circuit CTR determines that the duty cycle of the pulse width modulation signal PWM is gradually decreased to be smaller than the duty cycle of the on-time circuit signal SCOT or determines that the width of the pulse wave of the pulse width modulation signal PWM is gradually decreased to be smaller than the width of the pulse wave of the on-time circuit signal SCOT as shown in FIG. 2, the control circuit CTR controls the driver circuit DVR to drive the high-side switch HD and the low-side switch LD according to the on-time circuit signal SCOT.

The driver circuit DVR may, according to the control signal from the control circuit CTR, output the high-side driving signal to the control terminal of the high-side switch HD and output the low-side driving signal to the control terminal of the low-side switch LD to turn on or off the high-side switch HD and the low-side switch LD.

That is, when the load transits from the heavy load to the light load instantaneously such that the load current Iload required for the load is decreased, or the load is removed instantaneously such that the load current ILoad is not required for the load, the control circuit CTR determines states of the high-side switch HD and the low-side switch LD and outputs the control signal to the driver circuit DVR according to the on-time circuit signal SCOT. Then, the driver circuit DVR, according to the control signal, quickly turns off the high-side switch HD and turns on the low-side switch LD such that the output current IL supplied by the output terminal of the switching charger is decreased. As a result, the circuit components at the output terminal of the switching charger can be prevented from being damaged by the excessive output current IL (having an inrush wave).

Figure 3:
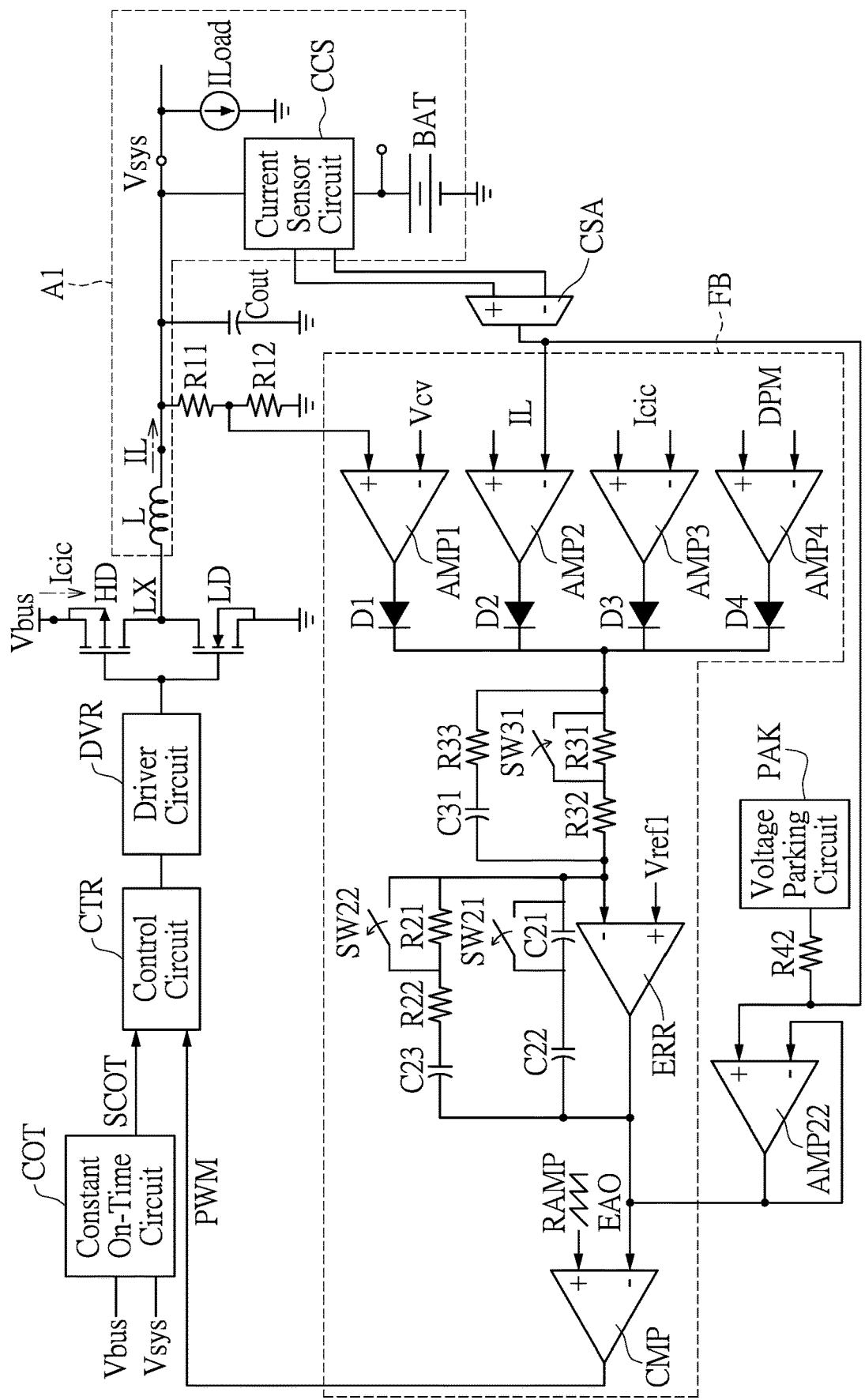
FIG. 3 is a circuit diagram of a switching charger having fast dynamic response for transition of a load according to a second embodiment of the pre sent disclosure.
Figure 4:
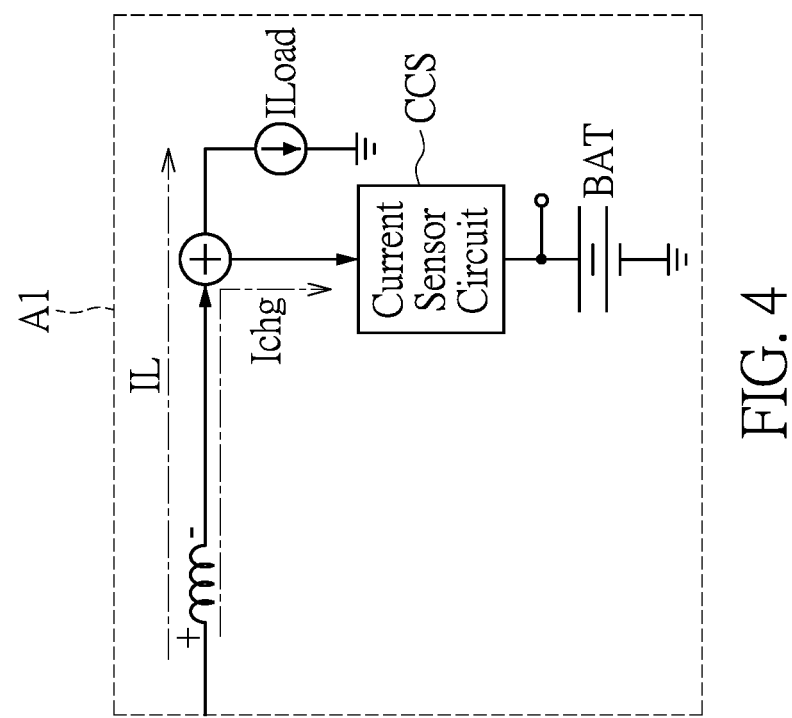
FIG. 4 is a circuit diagram of some of circuit components of the switching charger having the fast dynamic response for the transition of the load according to the second embodiment of the present disclosure.

Reference is made to FIGS. 3 and 4, in which FIG. 3 is a circuit diagram of a switching charger having fast dynamic response for transition of a load according to a second embodiment of the present disclosure, and FIG. 4 is a circuit diagram of some of circuit components of the switching charger having the fast dynamic response for the transition of the load according to the second embodiment of the present disclosure. The same descriptions of the first and second embodiments are not repeated herein.

It is worth noting that, as shown in a dotted line A1 in FIGS. 3 and 4, the output current IL of the switching charger is divided into two currents that are the load current ILoad and a charging current Ichg. It means that, the output current IL is a sum of the load current ILoad and the charging current Ichg. The switching charger supplies the load current ILoad to the load and supplies the charging current Ichg to a battery BAT. It should be understood that, when the load current ILoad required for the transition of the load is increased, the charging current Ichg being received by the battery BAT from the switching charger is decreased, under the condition that the output current IL of the switching charger is maintained at a constant value. Conversely, when the load current ILoad required for transition of the load is decreased, the charging current Ichg being received by the battery BAT from the switching charger is increased.

When the load transits from the light load to the heavy load such that the load current ILoad required for the load is increased instantaneously, the charging current Ichg being received by the battery BAT from the switching charger is too small and thus the battery BAT is charged by the charging current Ichg very slowly. Therefore, when the load transits from the light load to the heavy load, the on-time of the high-side switch HD of the switching charger must be extended such that the charging current Ichg of the battery BAT is increased with increase in the output current IL of the switching charger.

Conversely, when the load transits from the heavy load to the light load instantaneously such that the load current Iload required for the load is decreased, most of the output current IL of the switching charger is supplied to the battery BAT. When the load is removed instantaneously such that the load current ILoad is not required for the load, all of the output current IL of the switching charger is supplied to the battery BAT. As a result, the charging current Ichg being received by the battery BAT from the switching charger is instantaneously increased to an excessive current value. Therefore, when the load transits from the heavy load to the light load or the load is removed, the on-time of the high-side switch HD of the switching charger must be shorten such that the charging current Ichg of the battery BAT is decreased with decrease in the output current IL of the switching charger. As a result, the battery BAT can be prevented from overheating and from being damaged by the charging current Ichg having the excessive current value.

However, as shown in FIG. 3, the feedback circuit FB includes the large number of circuit components that perform the operations for a long time. When the load instantaneously transits from the light load to the heavy load, the error amplified signal EAO generated by the error amplifier ERR of the feedback circuit FB slowly rises. As a result, the duty cycle of the pulse width modulation signal PWM that is outputted according to the error amplified signal EAO and the ramp signal RAM by the comparator CMP of the feedback circuit FB is slowly increased.

Therefore, the switching charger of the embodiment of the present disclosure further includes a current sensor circuit CCS, a voltage parking circuit PAK, a current sensing amplifier CSA and an operational amplifier AMP22, but the present disclosure is not limited thereto. In practice, one or both of the current sensing amplifier CSA and the operational amplifier AMP22 may be omitted according to actual requirements.

The current sensor circuit CCS may be connected to the battery BAT in series. An output terminal of the current sensor circuit CCS may be connected to (two) input terminals of the current sensing amplifier CSA. The output terminal of the current sensor circuit CCS may be connected to the voltage parking circuit PAK. The voltage parking circuit PAK may be connected to a first input terminal such as a non-inverting input terminal of the operational amplifier AMP22. A second input terminal such as an inverting input terminal of the operational amplifier AMP22 may be connected to an output terminal of the operational amplifier AMP22 and the second input terminal such as the inverting input terminal of the comparator CMP.

If necessary, the switching charger further includes a resistor R42. A first terminal of the resistor R42 may be connected to the voltage parking circuit PAK. A second of the resistor R42 may be connected to an output terminal of the current sensing amplifier CSA and the first input terminal such as the non-inverting input terminal of the operational amplifier AMP22.

The current sensor circuit CCS may sense the charging current Ichg flowing to the battery BAT from the output node between the second terminal of the inductor L and the first terminal of the output capacitor Cout, and output a current sensed signal according to the sensed charging current Ichg. If necessary, the current sensing amplifier CSA may amplify the charging current Ichg sensed by the current sensor circuit CCS to output a current amplified signal. Then, the voltage parking circuit PAK may output a voltage parked signal according to the current amplified signal from the current sensing amplifier CSA.

In practice, the current sensing amplifier CSA may be omitted. If the current sensing amplifier CSA is omitted, the voltage parking circuit PAK may output the voltage parked signal according to the current sensed signal from the current sensor circuit CCS.

In detail, the voltage parking circuit PAK may determine a state of the transition of the load according to the charging current Ichg being sensed by the current sensor circuit CCS or the current amplified signal being generated according to the charging current Ichg amplified by the current sensing amplifier CSA. The voltage parking circuit PAK may further determine a voltage of the voltage parked signal according to the state of the load.

It should be understood that, a voltage of the second input terminal of the operational amplifier AMP22 is equal to a voltage of the first input terminal of the operational amplifier AMP22. When the first input terminal such as the non-inverting input terminal of the operational amplifier AMP22 receives the voltage parked signal from the voltage parking circuit PAK, the voltage of the second input terminal of the operational amplifier AMP22 is quickly increased or decreased to be equal to the voltage of the voltage parked signal. As a result, a voltage of the second input terminal such as the inverting input terminal of the comparator CMP is quickly increased or decreased to be equal to the voltage of the voltage parked signal.

When the switching charger operates in a PFM mode and the load is the light load that requires the larger load current ILoad, the charging current Ichg is decreased. At this time, the switching charger is switched from the PFM mode to a PWM operation mode. In the PWM operation mode, the voltage parking circuit PAK quickly pulls up the voltage of the second input terminal such as the inverting input terminal of the comparator CMP (that is the voltage of the error amplified signal EAO), according to a change in the charging current Ichg being sensed by the current sensor circuit CCS or a change in the current amplified signal being generated according to the charging current Ichg amplified by the current sensing amplifier CSA. As a result, the control circuit CTR may control the driver circuit DVR to extend the on-time of the high-side switch HD according to the pulse width modulation signal PWM outputted by the comparator CMP. As a result, the output current IL being supplied by the switching charger can quickly increase such that the charging current Ichg being received by the battery BAT from the switching charger is increased.

Conversely, when the load is removed or the load transits from the heavy load to the light load, the on-time of the high-side switch HD can be shorten, by the constant on-time circuit COT as described in the first embodiment, or by the current sensor circuit CCS, the voltage parking circuit PAK, (the current sensing amplifier CSA and the operational amplifier AMP22) as described in the second embodiment.

In detail, in the second embodiment, when the load is removed or the load transits from the heavy load to the light load, the voltage parking circuit PAK quickly pulls down the voltage of the second input terminal such as the inverting input terminal of the comparator CMP (that is the voltage of the error amplified signal EAO) according to the state of the load. Then, the control circuit CTR controls the driver circuit DVR to quickly shorten the on-time of the high-side switch HD according to the pulse width modulation signal PWM outputted by the comparator CMP. As a result, the charging current Ichg being received by the battery BAT from the switching charger is decreased to an appropriate value with decrease in the output current IL being supplied by the switching charger.

Figure 5:
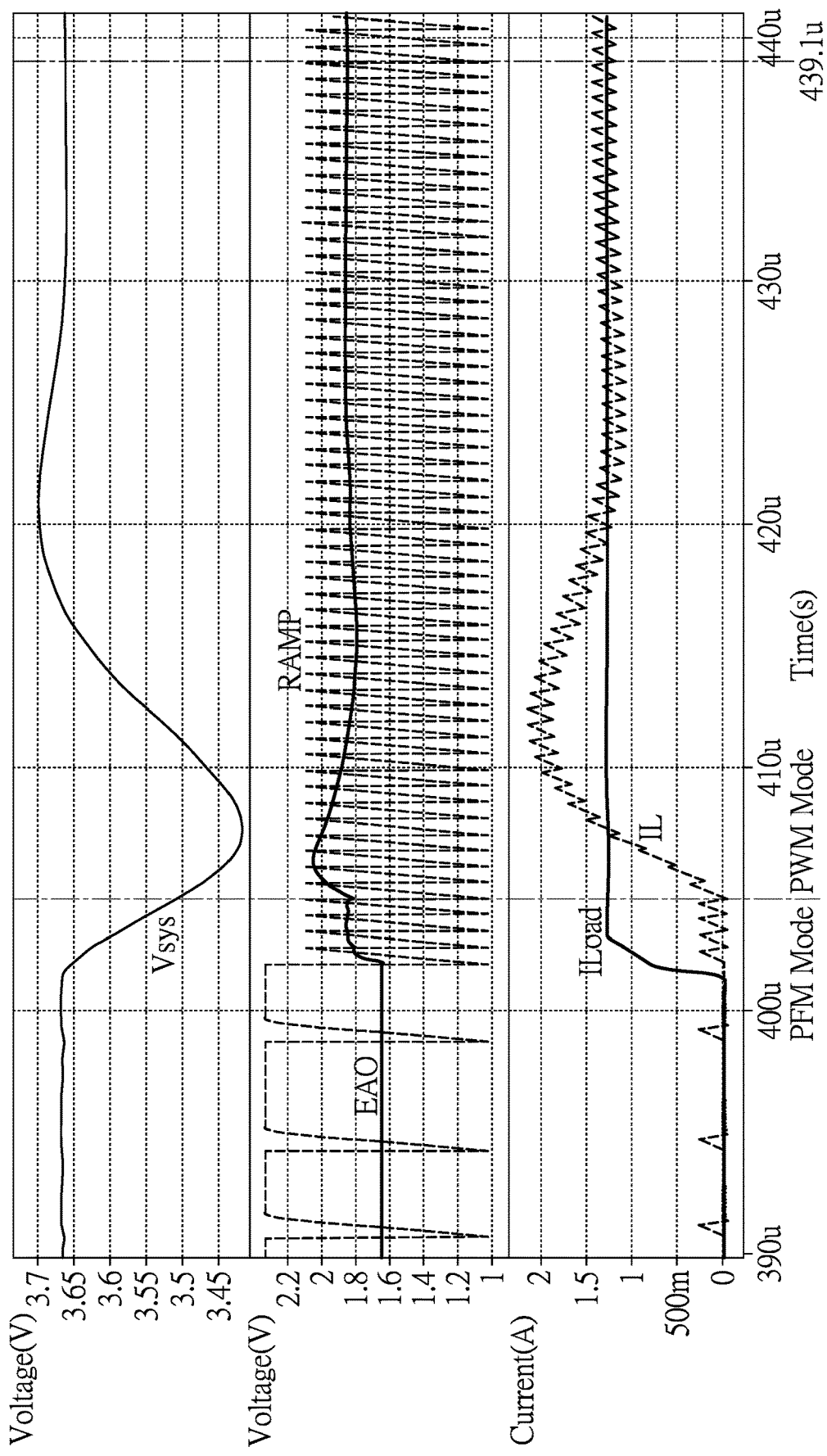
FIG. 5 is a waveform diagram of signals of the switching charger having the fast dynamic response for the transition of the load according to the second embodiment of the present disclosure.

Reference is made to FIGS. 3 to 5, in which FIG. 5 is a waveform diagram of signals of the switching charger having the fast dynamic response for the transition of the load according to the second embodiment of the present disclosure.

When the load is connected back to the switching charger or the load current Iload being supplied to the load from the switching charger is increased, the charging current Ichg being supplied to the battery BAT from the switching charger is decreased, and the output voltage Vsys of the output node between the second terminal of the inductor L and the first terminal of the output capacitor Cout is decreased. At this time, the voltage parking circuit PAK outputs the voltage parked signal for quickly pulling up the voltage of the second input terminal such as the inverting input terminal of the comparator CMP (that is the voltage of the error amplified signal EAO).

Then, the comparator CMP compares the voltage of the error amplified signal EAO being quickly pulled up to a target voltage value with the voltage of the ramp signal RAMP to output the pulse width modulation signal PWM. The control circuit CTR quickly controls the driver circuit DVR to turn on the high-side switch HD for a longer time according to the pulse width modulation signal PWM. As a result, the output current IL supplied by the switching charger is quickly increased such that the charging current Ichg being received by the battery BAT from the output current IL is increased.

Figure 6:
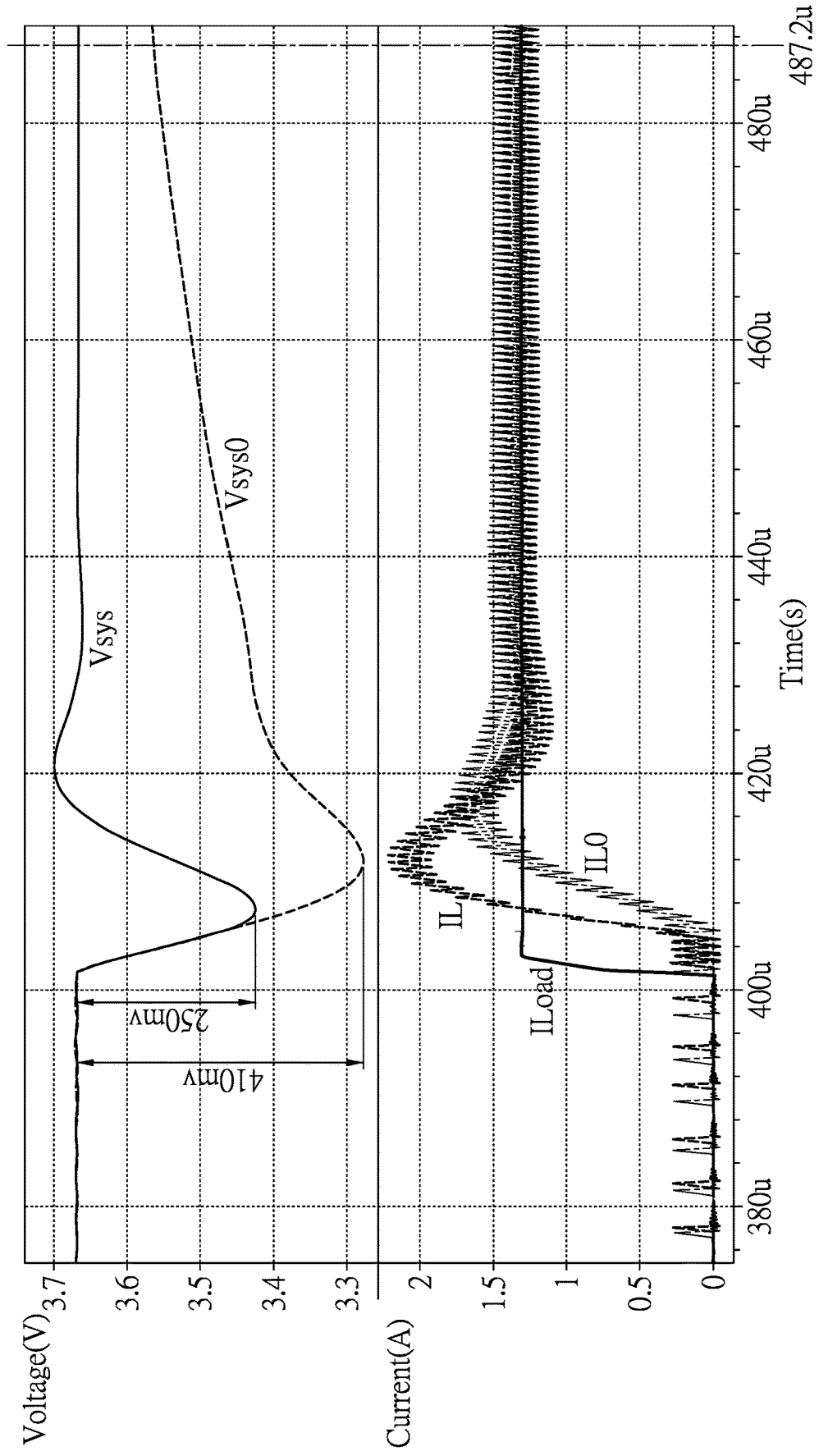
FIG. 6 is a waveform diagram of signals of the switching charger of the second embodiment of the present disclosure and a conventional switching charger.

Reference is made to FIGS. 3 and 6, in which FIG. 6 is a waveform diagram of signals of the switching charger of the second embodiment of the present disclosure and a conventional switching charger.

When the load is connected back to the conventional switching charger or the load transits from the light load to the heavy load, the load current ILoad required for the load is increased and an output voltage Vsys0 of the output terminal of the conventional switching charger drops down to a very low value. After the load transits from the light load to the heavy load or the load is connected back to the conventional switching charger, an output current IL0 of the conventional switching charger is slowly increased for a long time.

In contrast, when the load is connected back to the switching charger of the embodiments of the present disclosure or the load transits from the light load to the heavy load, the control circuit CTR of the switching charger of the present disclosure instantly controls the driver circuit DVR to turn on the high-side switch HD for a longer time such that the output current IL of the switching charger the present disclosure is quickly increased. As a result, the charging current Ichg being received by the battery BAT from the switching charger of the present disclosure is increased, and the output voltage Vsys of the output terminal of the switching charger of the present disclosure stops being decreased and is then quickly increased.

Figure 7:
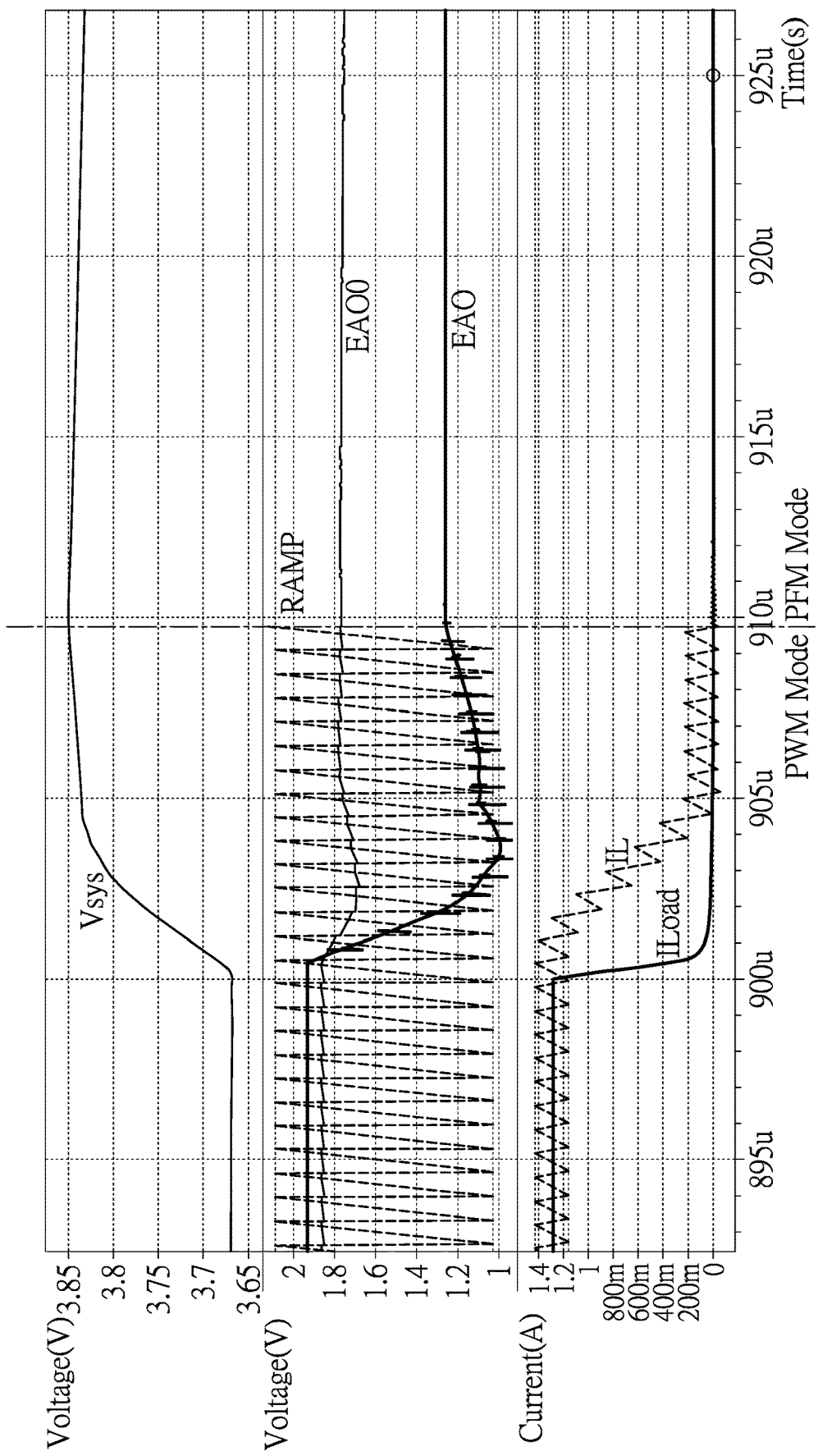
FIG. 7 is a waveform diagram of signals of the switching charger of the second embodiment of the present disclosure and the conventional switching charger.
Figure 8:
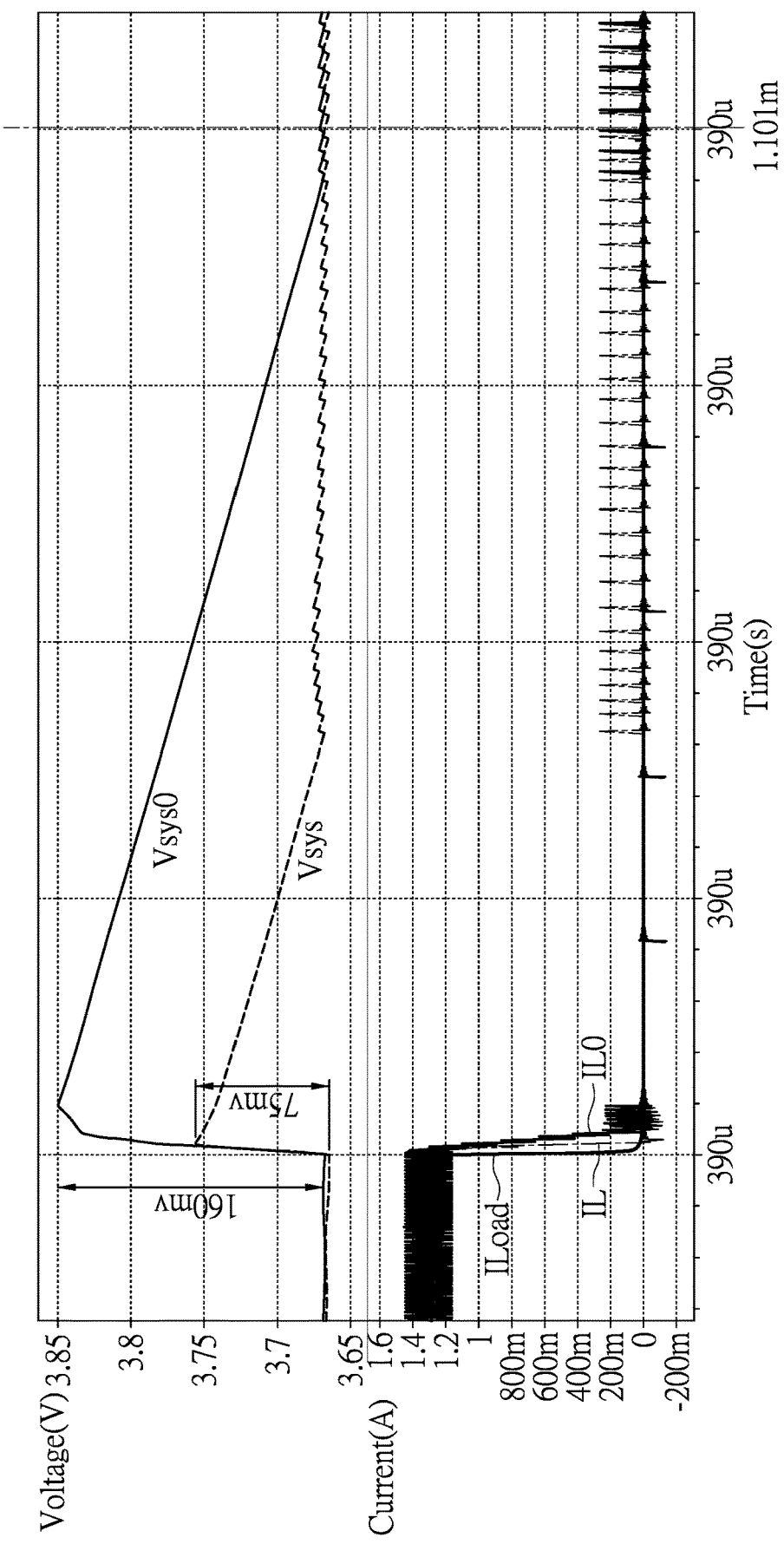
FIG. 8 is a waveform diagram of signals of the switching charger of the second embodiment of the present disclosure and the conventional switching charger.

Reference is made to FIGS. 3, 7 and 8, in which FIGS. 7 and 8 are waveform diagrams of the switching charger of the second embodiment of the present disclosure and the conventional switching charger.

When the load is removed from the switching charger of the second embodiment of the present disclosure or the load transits from the heavy load to the light load, the switching charger supplies the smaller load current ILoad to the load and supplies the larger charging current Ichg to the battery BAT. At this time, the voltage parking circuit PAK may output the voltage parked signal for quickly pulling down the voltage of the second input terminal such as the inverting input terminal of the comparator CMP (that is the voltage of the error amplified signal EAO).

Then, the comparator CMP compares the voltage of the error amplified signal EAO that is quickly pulled down to the target voltage value with the voltage of the ramp signal RAMP to output the pulse width modulation signal PWM. The control circuit CTR quickly controls the driver circuit DVR to turn on the high-side switch HD for a shorter time according to the pulse width modulation signal PWM. As a result, the output current IL supplied by the switching charger is quickly decreased such that the output voltage Vsys of the switching charger of the present disclosure is quickly decreased to reach an appropriate voltage value and the charging current Ichg being received by the battery BAT from the switching charger of the present disclosure is quickly decreased to reach a current required for the battery BAT.

In contrast, when the load is removed from the conventional switching charger or the load transits from the heavy load to the light load, the error amplified signal generated by the error amplifier ERR of the feedback circuit FB of the conventional switching charger is slowly decreased such that the output current IL0 of the conventional switching charger is slowly decreased. As a result, a battery is charged by an excessive charging current from the output current IL0 of the conventional switching charger such that the output voltage Vsys0 is increased to be a high voltage value, which causes a damage in the battery.

In conclusion, the present disclosure provides the switching charger having the fast dynamic response for the transition of the load. When the transition of the load instantaneously occurs, the switching of the high-side switch and the low-side switch of the switching charger of the present disclosure can be dynamically adjusted according to the state of the load in real time. Therefore, the output voltage of the switching charger of the present disclosure can be prevented from overshooting or undershooting. As a result, the switching charger of the present disclosure and the other circuit components that receive the output voltage from the switching charger can be prevented from being damaged by the overshooting or the undershooting of the output voltage of the switching charger of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A switching charger having fast dynamic response for transition of a load, comprising:
    a high-side switch, wherein a first terminal of the high-side switch is coupled to an input voltage;
    a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, a second terminal of the output capacitor is grounded, and an output node between the second terminal of the inductor and the first terminal of the output capacitor is connected to the load;
    a driver circuit connected to a control terminal of the high-side switch and a control terminal of the low-side switch, and configured to drive the high-side switch and the low-side switch;
    a constant on-time circuit configured to obtain the input voltage, configured to obtain a voltage of the output node as an output voltage of the switching charger, configured to determine a duty cycle or a width of a pulse wave of an on-time signal according to the input voltage and the output voltage of the switching charger, and configured to output the on-time signal;
    a control circuit connected to the driver circuit and the constant on-time circuit, and configured to control the driver circuit according to the on-time signal;
    a current sensor circuit connected between the output node and a battery, and configured to sense a charging current that flows to the battery from the output node to output a current sensed signal; and a voltage parking circuit connected to the current sensor circuit and the second input terminal of the comparator, and configured to output a voltage parked signal according to the current sensed signal;

an error amplifier, wherein a first input terminal of the error amplifier is connected to the output node, and a second input terminal of the error amplifier is connected to a first reference voltage; and a comparator, wherein a first input terminal of the comparator is connected to a ramp signal generator and configured to receive a ramp signal from the ramp signal generator, a second input terminal of the comparator is connected to an output terminal of the error amplifier and an output terminal of the voltage parking circuit, and an output terminal of the comparator is connected to the control circuit.

2. The switching charger according to claim 1, wherein, when the control circuit determines that a duty cycle of the pulse width modulation signal is larger than the duty cycle of the on-time signal or determines that a width of a pulse wave of the pulse width modulation signal is larger than the width of the pulse wave of the on-time signal, the control circuit controls the driver circuit according to the pulse width modulation signal.

3. The switching charger according to claim 2, wherein, when the control circuit determines that the duty cycle of the pulse width modulation signal is not larger than the duty cycle of the on-time signal or determines that the width of the pulse wave of the pulse width modulation signal is not larger than the width of the pulse wave of the on-time signal, the control circuit controls the driver circuit according to the on-time signal.

4. The switching charger according to claim 1, further comprising:

a current sensing amplifier connected to the current sensor circuit and the voltage parking circuit, wherein the current sensing amplifier is configured to amplify the charging current sensed by the current sensor circuit to output a current amplified signal to the voltage parking circuit, and the voltage parking circuit outputs the voltage parked signal to the second input terminal of the comparator according to the current amplified signal.

5. The switching charger according to claim 4, further comprising:

an operational amplifier, wherein a first input terminal of the operational amplifier is connected to the voltage parking circuit, a second input terminal of the operational amplifier is connected to an output terminal of the operational amplifier and the second input terminal of the comparator, and the voltage parking circuit outputs the voltage parked signal to the first input terminal of the operational amplifier according to the current amplified signal.

6. The switching charger according to claim 5, further comprising:

a resistor, wherein a first terminal of the resistor is connected to the voltage parking circuit, and a second terminal of the resistor is connected to the first input terminal of the operational amplifier.

7. The switching charger according to claim 1, further comprising:

a first feedback capacitor and a second feedback capacitor, wherein a first terminal of the first feedback capacitor is connected to the first input terminal of the error amplifier, a second terminal of the first feedback capacitor is connected to a first terminal of the second feedback capacitor, and a second terminal of the second feedback capacitor is connected to the output terminal of the error amplifier.

8. The switching charger according to claim 7, further comprising:

a first feedback switch, wherein a first terminal of the first feedback switch is connected to the first terminal of the first feedback capacitor, and a second terminal of the first feedback switch is connected to the second terminal of the first feedback capacitor.

9. The switching charger according to claim 8, further comprising:

a first feedback resistor, a second feedback resistor and a third feedback capacitor, a first terminal of the first feedback resistor is connected to the first input terminal of the error amplifier, a second terminal of the first feedback resistor is connected to a first terminal of the second feedback resistor, a second terminal of the second feedback resistor is connected to a first terminal of the third feedback capacitor, and a second terminal of the third feedback capacitor is connected to the output terminal of the error amplifier.

10. The switching charger according to claim 9, further comprising:

a second feedback switch, wherein a first terminal of the second feedback switch is connected to the first terminal of the first feedback resistor, and a second terminal of the second feedback switch is connected to the second terminal of the first feedback resistor.

11. The switching charger according to claim 10, further comprising:

a voltage divider circuit including a first voltage dividing resistor and a second voltage dividing resistor, wherein a first terminal of the first voltage dividing resistor is connected to the output node, a second terminal of the first voltage dividing resistor is connected to a first terminal of the second voltage dividing resistor, a second terminal of the second voltage dividing resistor is grounded, and a feedback node between the second terminal of the first voltage dividing resistor and the first terminal of the second voltage dividing resistor is connected to the first input terminal of the error amplifier.

12. The switching charger according to claim 11, further comprising:

an operational amplifier, wherein a first input terminal of the operational amplifier is connected to the feedback node, a second input terminal of the operational amplifier is coupled to a second reference voltage, and an output terminal of the operational amplifier is connected to the first input terminal of the error amplifier.

13. The switching charger according to claim 12, further comprising:

a diode, wherein an anode of the diode is connected to the output terminal of the operational amplifier and a cathode of the diode is connected to the first input terminal of the error amplifier.

14. The switching charger according to claim 13, further comprising:

a first resistor, wherein a first terminal of the first resistor is connected to the cathode of the diode and a second terminal of the first resistor is connected to the first input terminal of the error amplifier.

15. The switching charger according to claim 14, further comprising:

a second resistor, wherein a first terminal of the second resistor is connected to the second terminal of the first resistor, and a second terminal of the second resistor is connected to the first input terminal of the error amplifier.

16. The switching charger according to claim 15, further comprising:
a first switch component, wherein a first terminal of the first switch component is connected to the first terminal of the first resistor, and a second terminal of the first switch component is connected to the second terminal of the first resistor.

17. The switching charger according to claim 16, further comprising:
a third resistor and a first capacitor, wherein a first terminal of the third resistor is connected to the cathode of the diode, a second terminal of the third resistor is connected to a first terminal of the first capacitor, and a second terminal of the first capacitor is connected to the first input terminal of the error amplifier.

* * * * *